US007620855B2

(12) United States Patent  (10) Patent No.: US 7,620,855 B2
DeCenzo et al.  (45) Date of Patent: Nov. 17, 2009

(54) SELF-DEFINING COUNTERS

(75) Inventors: David P. DeCenzo, Pueblo, CO (US);
Clark E. Lubbers, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/479,730

(22) Filed: Jun. 30, 2006

(65) Prior Publication Data
US 2008/0005627 A1  Jan. 3, 2008

(51) Int. Cl.
G06F 11/00 (2006.01)
(52) U.S. Cl. ......................................................... 714/48
(58) Field of Classification Search ..................... 714/48
See application file for complete search history.

(56) References Cited

U.S. PATENT DOCUMENTS

| 5,245,615 | A | * | 9/1993 | Treu | 714/45 |
|---|---|---|---|---|---|
| 5,774,647 | A | * | 6/1998 | Raynham et al. | 714/48 |
| 5,784,394 | A | * | 7/1998 | Alvarez et al. | 714/800 |
| 5,958,066 | A |  | 9/1999 | Kedem |  |
| 6,834,326 | B1 |  | 12/2004 | Wang et al. |  |
| 7,016,957 | B2 | * | 3/2006 | Morimoto et al. | 709/224 |
| 7,136,768 | B1 | * | 11/2006 | Shah et al. | 702/115 |
| 7,225,368 | B2 | * | 5/2007 | Lancaster | 714/48 |
| 2003/0115508 | A1 | * | 6/2003 | Ali et al. | 714/43 |
| 2005/0015685 | A1 |  | 1/2005 | Yamamoto |  |
| 2006/0010352 | A1 | * | 1/2006 | Mukherjee et al. | 714/47 |
| 2006/0075156 | A1 | * | 4/2006 | Okaki et al. | 710/17 |
| 2006/0100842 | A1 |  | 5/2006 | Dominguez et al. |  |
| 2006/0101101 | A1 |  | 5/2006 | Pandit et al. |  |
| 2007/0198111 | A1 | * | 8/2007 | Oetzel et al. | 700/94 |

* cited by examiner

*Primary Examiner*—Emerson C Puente
(74) *Attorney, Agent, or Firm*—Fellers, Snider, et al.

(57) ABSTRACT

An apparatus and associated method for deriving an error code value to characterize an error event that occurs during execution of an access command, memorializing the error event in an indexable error table, and logging an association of the error code value and an index in the error table related to the error event.

7 Claims, 9 Drawing Sheets

158 ─➤

160 ─➤

[+6708 72410001 002a9858 0:7] scsi disk: CHECK CONDITION on disk 0:6:5:0
Read of logical block 509856, count 128
disk sd45a, block 254920, 65536 bytes
Valid = 1, Error code = 0x70
170 ─── Segment number = 0x00, Filemark = 0, EOM = 0, ILI = 0
➤ Sense key = 0x6, "UNIT ATTENTION"
Information = 0x00 0x07 0xc7 0xe4
[+6709 72410001 002a9a10 0:7] scsi disk:       Additional sense length = 0x0a
Command-specific information = 0x00 0x00 0x00 0x00
➤ Additional sense = 0x29, Qualifier = 0x02 ◄─
Field replaceable unit code = 0xea                180
178   SKSV = 1, C/D = 0, BPV = 0, Bit pointer = 0
Field pointer = 0x0003

FIG. 9

DEVICE STATUS CODE    ─159

| 164 | 166 | 168 |
|---|---|---|
| 00h | GOOD | 0h |
| 02h | CHECK CONDITION | 1h |
| 04h | CONDITION MET | 2h |
| 08h | BUSY | 3h |
| 10h | INTERMEDIATE | 4h |
| 14h | INTERMEDIATE – CONDITION MET | 5h |
| 18h | RESERVATION CONFLICT | 6h |
| 22h | COMMAND TERMINATED | 7h |
| 28h | QUEUE FULL | 9h |

FIG. 10

SENSE CODE 172

| 174 | 176 |
|---|---|
| 0h | NO SENSE |
| 1h | RECOVERED ERROR |
| 2h | NOT READY |
| 3h | MEDIUM ERROR |
| 4h | HARDWARE ERROR |
| 5h | ILLEGAL REQUEST |
| 6h | UNIT ATTENTION |
| 7h | DATA PROTECT |
| 8h | BLANK CHECK |
| 9h | VENDOR-SPECIFIC |
| ah | COPY ABORTED |
| bh | ABORTED COMMAND |
| ch | EQUAL |
| dh | VOLUME OVERFLOW |
| eh | MISCOMPARE |
| fh | RESERVED |

FIG. 11

ASC/ASQC CODE (PARTIAL LIST) 180

| 182 | 184 | 186 |
|---|---|---|
| | | ⋮ |
| 00h | 02h | END OF PARTITION/MEDIUM DETECTED |
| | 04h | BEGINNING OF PARTITION/MEDIUM DETECTED |
| | 06h | I/O PROCESS TERMINATED |
| | | ⋮ |
| 01h | 00h | NO INDEX/SECTOR SIGNAL |
| 02h | 00h | NO SEEK COMPLETE |
| 03h | 00h | PERIPHERAL DEVICE WRITE FAULT |
| | 01h | NO WRITE CURRENT |
| | 02h | EXCESSIVE WRITE ERRORS |
| | | ⋮ |
| 04h | 02h | LOGICAL UNIT NOT READY, INITIALIZING COMMAND |
| | | ⋮ |
| | 05h | LOGICAL UNIT NOT READY, REBUILD IN PROGRESS |
| | | ⋮ |
| | 08h | LOGICAL UNIT NOT READY, LONG WRITE IN PROGRESS |
| | | ⋮ |
| 29h | 01h | POWER ON OCCURRED |
| | 02h | SCSI BUS RESET OCCURRED |
| | 03h | BUS DEVICE RESET FUNCTION OCCURRED |
| | | ⋮ |
| 73h | 11h | CURRENT POWER CALIBRATION AREA IS FULL |
| | 17h | RDZ IS FULL |

FIG. 12

0001 0110 00101001 00000010
STATUS SENSE ASC ASQC

| n | error code value | count |
|---|---|---|
| 1 | 0001011000101001000000010 | $C_1$ |
| 2 | 0001011000101101000010010 | $C_2$ |
| 3 | 0001011000110011001010110 | $C_3$ |
| ⋮ | ⋮ | |
| n | 0111110101100000001011011 | $C_n$ |
| n+1 | 0101100100101101001010111 | $C_{n+1}$ |
| n+2 | | |
| n+3 | | |
| ⋮ | | |
| n+i | | $C_{n+i}$ |
| z | None of the above | $C_z$ |

SELF-DEFINING COUNTERS

FIELD OF THE INVENTION

The claimed invention relates generally to the field of computer software and more particularly, but not by way of limitation, to an apparatus and method for real time logging of event errors associated with execution of a service request in a software system.

BACKGROUND

Computer-based systems enable a wide variety of data processing tasks to be accomplished in a fast and efficient manner. From hand-held consumer products to geographically distributed storage area networks with multi-device data storage arrays, such systems continue to proliferate into all areas of society and commerce.

Software is provided to direct the operation of such systems. Software (including firmware) can take a number of forms such as application programs, operating systems, interface and controller routines, and maintenance and housekeeping modules.

Each time a process is initiated by the software, a number of additional processes, handshakes, links, calculations, and other events can be carried out by the various layers of software in order to service and complete the service request. Generally, with increased complexity in the overall software system, including additional layers of software applications and operating systems, distributed processing and fault tolerant redundancy, it becomes increasingly difficult to assess the root cause of errors and the extent to which undocumented errors occur while carrying out a given process. A high occurrence rate of a particular error or cascading error events can quickly overwhelm the system's ability to effectively track errors. Also, an unexpected error can easily go unrecognized and hence escape effective root cause resolution.

In some solutions these resultant events are logged for purposes of analysis in the event an execution error is identified. However, typically the error is identified at some time after the execution step causing the error, making it painstakingly difficult, if not impossible, to trace back through the logged events to ascertain a root cause. What is needed are improved solutions providing a real time analysis of system execution errors. It is to these benefits and advantages that the embodiments of the present invention are directed.

SUMMARY OF THE INVENTION

Embodiments of the present invention are generally directed to a method and an apparatus for logging event errors associated with execution of a service request in a software system, such as a computer-based system comprising a multi-disc data storage array.

In some embodiments a method is provided for deriving an error code value to characterize an error event that occurs during execution of an access command, memorializing the error event in an indexable error table, and logging an association of the error code value and an index in the error table related to the error event.

In some embodiments a method is provided for logging an error event occurring during execution of access commands by deriving an error code value from information parsed from a SCSI error message that is associated with the error event.

In some embodiments a data storage system is provided having a software system resident in a memory space configured to execute access commands, and means for logging error events occurring while executing the access commands.

These and various other features and advantages which characterize the claimed invention will become apparent upon reading the following detailed description and upon reviewing the associated drawings.

BRIEF DESCRIPTION OF THE DRAWINGS

FIG. 9 is an illustrative SCSI error message with content that is parsed to derive the self-defining error repository of FIG. 8.

FIG. 10 is a table of SCSI device status codes.

FIG. 11 is a table of SCSI sense codes.

FIG. 12 is a table of a partial listing of SCSI ASC/ASCQ codes.

DETAILED DESCRIPTION

Figure 1:
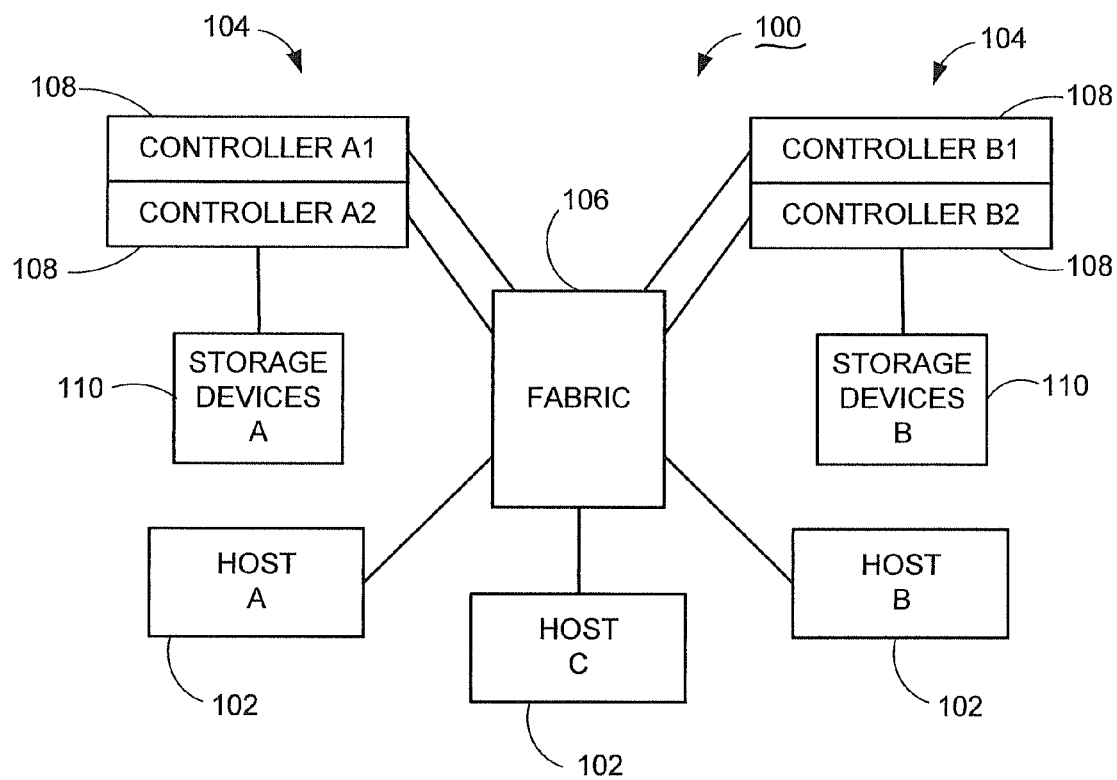
FIG. 1 is a top level functional block depiction of a computer-based system characterized as a storage area network utilizing mass storage.

To illustrate an exemplary environment in which presently preferred embodiments of the present invention can be advantageously practiced, FIG. 1 shows a computer-based system 100 characterized as a storage area network (SAN) utilizing mass storage.

The system 100 includes a number of host computers 102, respectively identified as hosts A, B and C. The host computers 102 interact with each other as well as with a pair of data storage arrays 104 (denoted A and B, respectively) via a fabric 106. The fabric 106 is preferably characterized as a fibre-channel based switching network, although other configurations can be utilized as well, including the Internet.

Each array 104 includes a pair of controllers 108 (denoted A1, A2 and B1, B2 respectively) and a set of data storage devices 110 preferably characterized as hard disc drives operated as a RAID (redundant array of independent discs). The controllers 108 and devices 110 preferably utilize a fault tolerant arrangement so that the various controllers 108 utilize parallel, redundant links and at least some of the user data stored by the system 100 is mirrored on both sets of devices 110.

It is further contemplated that the A host computer 102 and the A data storage array 104 are physically located at a first site, the B host computer 102 and B storage array 104 are physically located at a second site, and the C host computer 102 is at yet a third site, although such is merely illustrative and not limiting.

Figure 2:
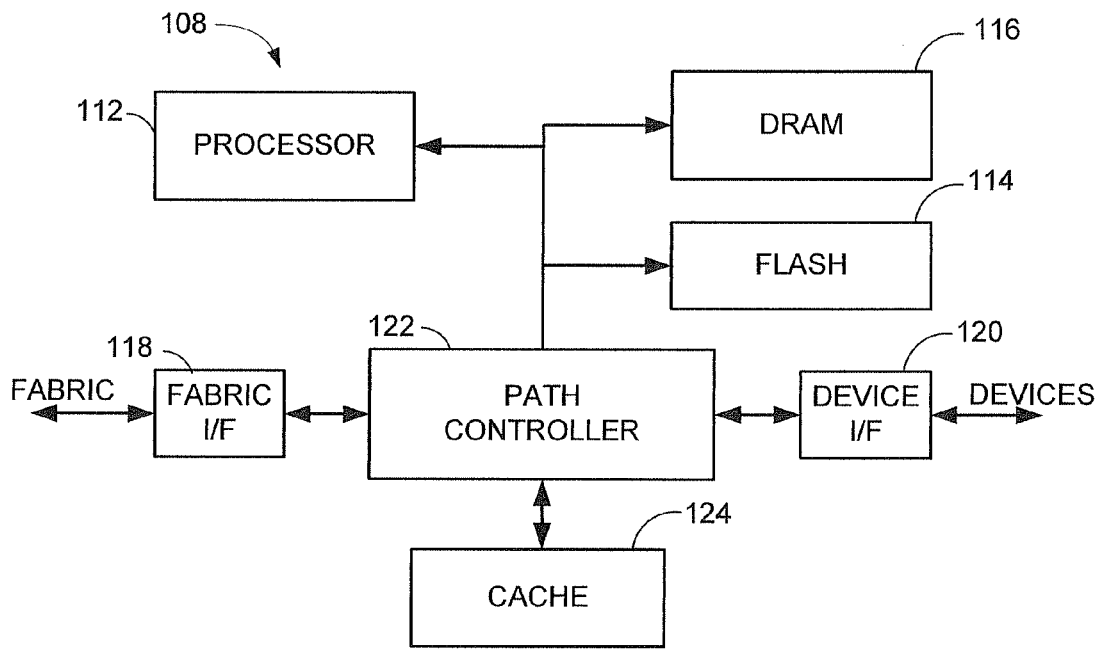
FIG. 2 provides a functional block diagram to illustrate a selected one of the controllers of FIG. 1.

FIG. 2 illustrates a selected one of the controllers 108 in greater detail. The controller 108 can be embodied in a single integrated circuit, or distributed among a number of discrete circuits as desired.

A main processor 112, preferably characterized as a programmable, general purpose computer processor, provides top level control in accordance with programming steps and processing data stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 110. The I/F circuits 118, 120 and a path controller 122 form a communication path to pass commands and data between the storage array and the host using cache memory 124.

Figure 3:
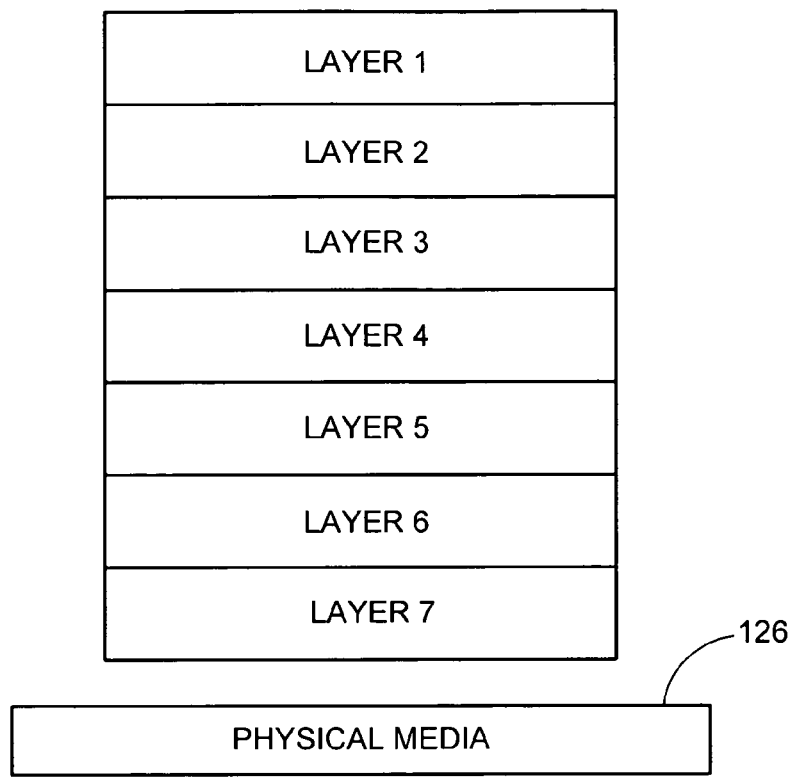
FIG. 3 illustrates a number of different software layers utilized by the system of FIG. 1.

FIG. 3 provides a generalized depiction of a preferred arrangement for software utilized by the system 100 of FIG. 1. In FIG. 3, the software is viewed as being arranged in a number of hierarchical layers (in this case Layer 1 through Layer 7), with Layer 1 representing a top-most layer in farthest proximity to physical media 126 of the devices 110, and Layer 7 representing a bottom-most layer most closely associated with the media 126. Other suitable arrangements can be used as desired, including different numbers and types of layers. For purposes of the present discussion, it is contemplated that Layers 1-3 generally represent application routines and operating systems utilized by the host computers 102, Layers 4-5 represent routines and modules at the controller 108 level, and layers 6-7 represent routines and modules at the device 110 level.

As will be recognized, a data transfer request from a selected host computer 102 to write data to the devices 110 will invoke one or more host level command processes. Such processes in turn invoke various other processes down and back up through the various layers to ultimately result in the completion of the desired task. Along the way, various system resources are allocated, utilized and released.

Figure 4:
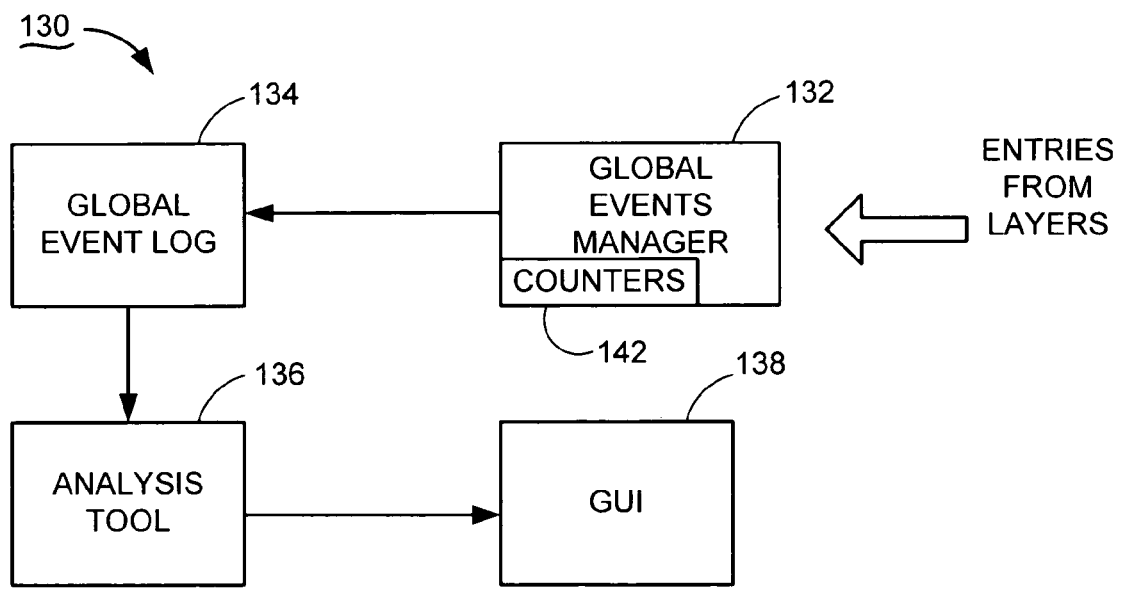
FIG. 4 provides a preferred arrangement for an event log and analysis module utilized by the software of FIG. 3.

FIG. 4 represents a preferred arrangement for an event log and analysis module 130 used to collect entries associated with each atypical event detected or generated by the software of the system 100. The module 130 preferably includes a global events manager 132, a global event log 134, an analysis tool 136, and a graphical user interface (GUI) 138.

Figure 5:
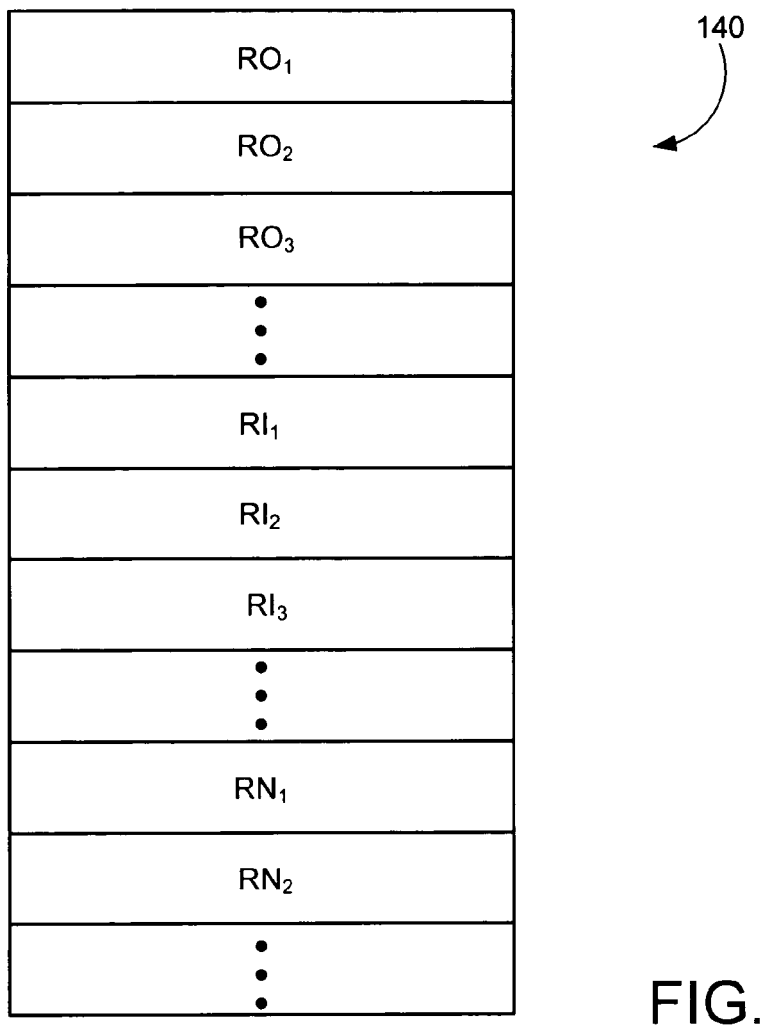
FIG. 5 shows a resource index stack to identify system resources available to the software of FIG. 3.

FIG. 5 provides a resource index stack 140 to illustrate various types of system resources utilized by the system software. Because the formats and nomenclatures for the resources can vary widely depending upon the architecture of a given application, for simplicity the resources will be generically referred to as Resource 0 through Resource N. Resource 1, for example, can represent an operation request which is used to identify various variables, values or attributes associated with a given host level command process, and so on.

Figure 6:
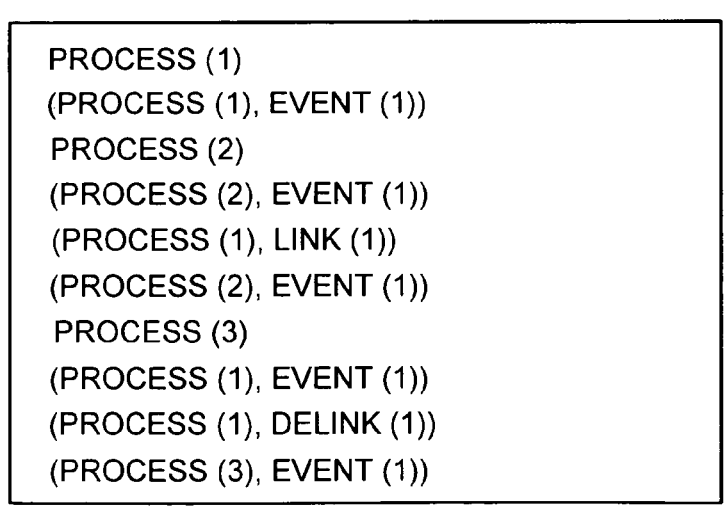
FIG. 6 depicts a generalized format for the global event log of FIG. 4.

During operation, a service request will generally allocate one or more of the resources to perform a desired operation, and may invoke or link to one or more lower level processes until the service request is completed. Preferably, upon the operation of every event, each of the software layers may decide to provide an entry into the global event log 134, as depicted by FIG. 6. The log 134 is preferably written to a selected disc location on the media 126 and represents a sequential listing of all atypical events detected or generated by the software.

Each entry is associated with a respective event, and extracts the relevant data pertaining to the operational state of the software system at a time corresponding to the event. The size of the log (i.e., the amount of memory allocated therefor) can be selectively varied by the log manager and by inputs from the user. A larger allocated space will track a greater history window, but will also consume greater system resources. It is contemplated that the log is preferably sized to reflect the better part of a year of continued operation of the system 100. The log 134 is further preferably characterized as having a buffer for storing a predetermined plurality of the entries, which can be batch processed as necessary for reducing the processing overhead burden on the system 100. Counters 142 (FIG. 4) of the log manager 132 can be used for limiting the number of entries logged per unit of time by event class and device.

Figure 7:
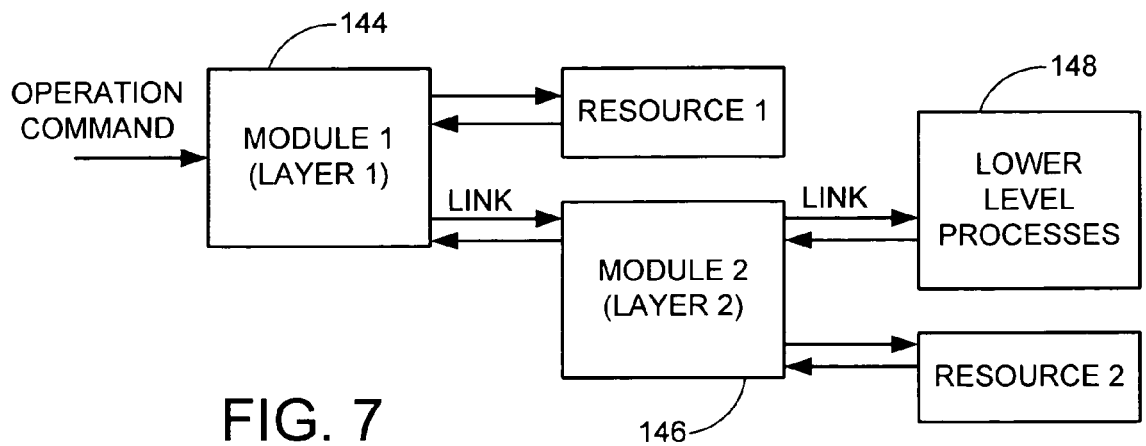
FIG. 7 generally illustrates a partial chain of events carried out in response to issuance of an access request.

FIG. 7 represents initial operations carried out in response to a selected initiating process. For purposes of illustration, it is contemplated that this process is an access command associated with the writing of user data by a selected host computer 102 to the devices 110.

As shown by FIG. 7, the top level command invokes the operation of a first module 144 in Layer 1 which allocates a first resource (Resource 1) and links to a second module 146 in Layer 2. The second module 146 allocates a second resource (Resource 2) and performs one or more additional links to lower level processes (denoted at 148). This process will continue until at some point the user data are transferred to cache memory 124 (FIG. 2), a write-back command is issued to the initiating host computer 102, the data are transferred to the appropriate physical media 126, and the responsible controller is notified that the data have been successfully written. It will be noted that the global event log 134 preferably captures all atypical events relating to the service request, including events that are carried out after the top level process has been identified as being completed (as in, for example, the case of write-back data).

The log 134 can be updated in a real-time fashion, but process efficiencies can be generally obtained by caching, at either a layer level and/or at a device level, a short listing of the recent events which is then transferred to the log manager at an appropriate time. In this way, the global collection of event data as described herein can have a reduced, if not wholly transparent, effect upon system 100 availability.

Figure 8:
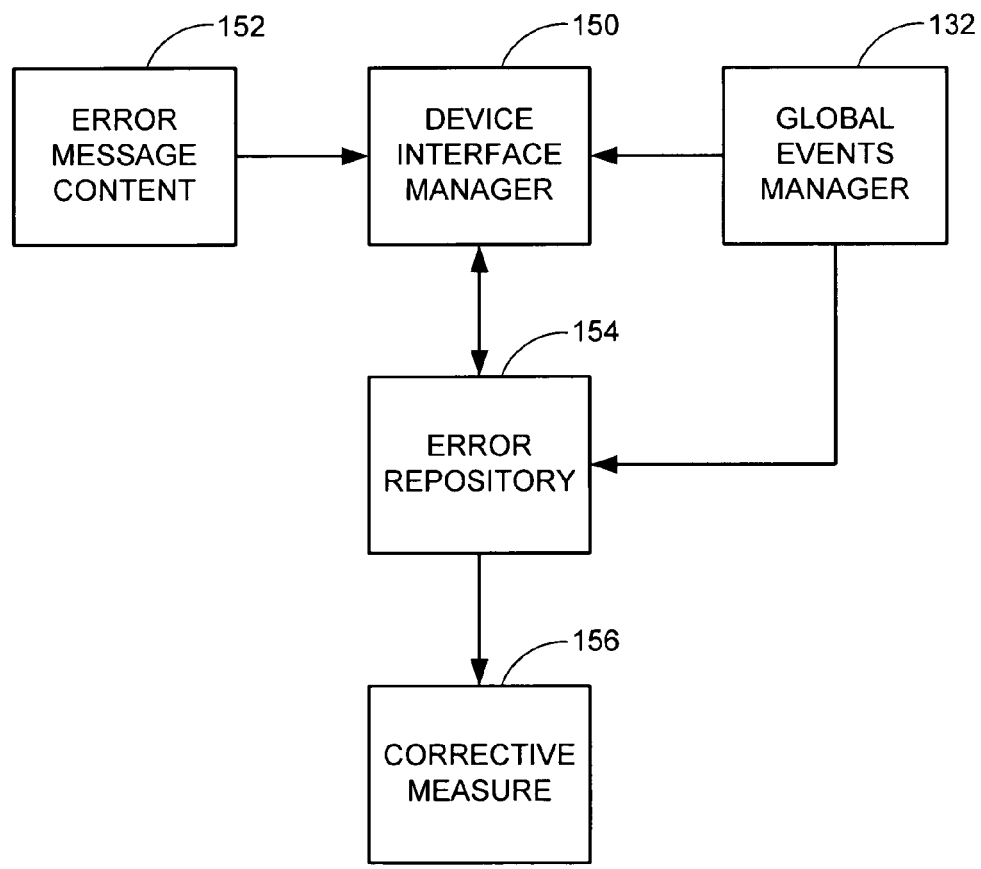
FIG. 8 provides a preferred arrangement for a self-defining error repository utilized by the software of FIG. 3.

FIG. 8 shows that the global events manager 132 also reports occurrences of errors to a device interface manager 150 during execution of the access commands. The device interface manager 150 of the present embodiments combines this notice of an error with substantive content from the error message in block 152 to construct and maintain an error repository 154 that contains state, activity data, and error counts for all devices managed by the system. The error repository 154, in turn, can be used by the system software to invoke corrective measures in block 156 to counteract the error(s).

From the following it will be understood that the device interface manager 150 module of the present embodiments derives an error code value to characterize an error event, and then memorializes the error event in the error repository 154 which is indexable by error code values.

Entirely for purposes of illustration, and not by way of limitation, FIG. 9 shows a typical SCSI error message 158, which contains the error message content 152. For example, the SCSI error message 158 contains a status code 160 which in this example is "check condition." FIG. 10 is a table 159 stored in memory listing all industry-standardized device status codes used in SCSI error messages. The first column 164 of the table 159 lists the SCSI status codes, followed by respective descriptions in column 166. Accordingly, the status code "check condition" is normally associated with the SCSI status code 02h. Although these status codes are normally represented by two-digit hexadecimal values, there are only nine unique status codes in play. For simplicity sake, the present embodiments can redesignate the status codes with corresponding one-digit hexadecimal values as listed in column 168 of table 159.

The SCSI error message 158 in FIG. 9 also contains a sense code 170 which in this example is "0x6 unit attention." FIG. 11 is a table 172 of all industry-standardized sense codes used in SCSI error messages. The first column 174 of the table 172 lists the sense codes, followed by respective descriptions in column 176. Accordingly, the sense code 0x6 (which is equivalently written as 6h) is associated with "unit attention."

The SCSI error message 158 of FIG. 9 also contains an additional sense code 178 ("ASC") and an additional sense code qualifier 180 ("ASCQ"). FIG. 12 is a table 180 showing a partial listing of industry-standardized ASC/ASCQ codes, wherein the first column 182 lists the ASC 178, the second column 184 lists the ASQC 180, and the third column 186 respectively lists a description. Accordingly, the ASC/ASCQ code 29h/02h in the SCSI error message 158 corresponds to "SCSI BUS RESET OCCURRED."

Although there is a manageable number of status codes 160 and sense codes 170, presently there are nearly six hundred unique ASC/ASCQ codes 178, 180. Providing software logic to counteract all the many thousands of possible combinations of these codes is cumbersome at best, and will always be of greatly diminished value because it has been observed that only a small percentage of all code combinations are actually encountered.

The present embodiments address this situation by providing a three-tier indexable error table. In the first tier fixed entries are indexed that are associated with expected errors. The second tier contains errors that are unexpected. The third tier is an index associated with "None of the Above." This third tier indexes unexpected errors that occurred after the second tier became full, and did not qualify for replacing one of the existing entries in the error table.

The device interface manager 150 of the present embodiments parses content from the error message(s) to derive a quantified error value across all the desired codes in the error message. The quantified error value can then be memorialized in an indexable error table 191 shown in FIG. 14. For example, FIG. 13 shows a binary error code value 190 derived by combining the SCSI error message 158 content described above.

That is, the error code value 190 has a first portion (0001) formed by parsing the 4 bit status code 1h (from column 168 of table 159 in FIG. 10) from the error message 158. Similarly the error code value 190 has a second portion (0110) formed by parsing the 4 bit sense code 6h; a third portion (00101001) formed by parsing the 8 bit ASC 29h; and a fourth portion (00000010) formed by parsing the 8 bit ASCQ 02h.

Figures 13, 14:
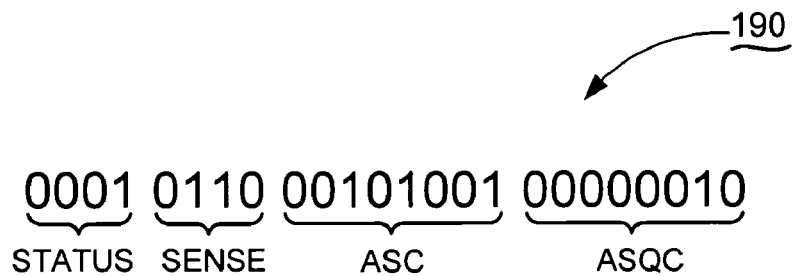
FIG. 13 is an error code value derived from the content of the SCSI error message of FIG. 9.
FIG. 14 provides a preferred arrangement for a self-defining error table in accordance with embodiments of the present invention.

This twenty-four bit error code value 190 is shown to be the first entry in the error table 191 shown in FIG. 14 that is constructed and stored in memory in accordance with embodiments of the present invention. The error table 191 is constructed with the first tier of n fixed entries, representing those error code values that are expected and/or are particularly important to log. The error table 191 is also expandable in the second tier to add up to n+i entries when an unexpected error code value is encountered that is not found in the first tier. The present embodiments contemplate that in some embodiments it can be advantageous for n to be zero or a small number, so that the entire error table or most of it is derived empirically as the error messages are encountered.

As unexpected errors are encountered the second tier will fill and eventually become full. Memory and resource constraints determine the optimal size for the second tier in the error table. When a new unexpected error is encountered and the second tier is full, a decision is made whether to replace one of the existing second tier entries with it.

The rules used for making this determination will vary according to the user's specific facts, but in some embodiments an existing entry can be replaced if it has not been referenced within a predetermined time period. For example, without limitation, the device interface manager can query all the expandable entries (n+1 to n+i) and select the least recently used entry of all those not referenced within the last hour. In other embodiments the device interface manager can select the least frequently used entry of all those not referenced with a preselected time period.

If it is determined that the new unexpected error will not replace any of the existing second tier entries, then it is indexed to "z" which is associated with "None of the Above." Preferably, the event is also logged in the global event log 134 for memorializing it; otherwise all that is discernible is the number of "None of the Above" events that occurred, from counter CZ, without knowledge as to the distribution of error code values within that index.

Figure 15:
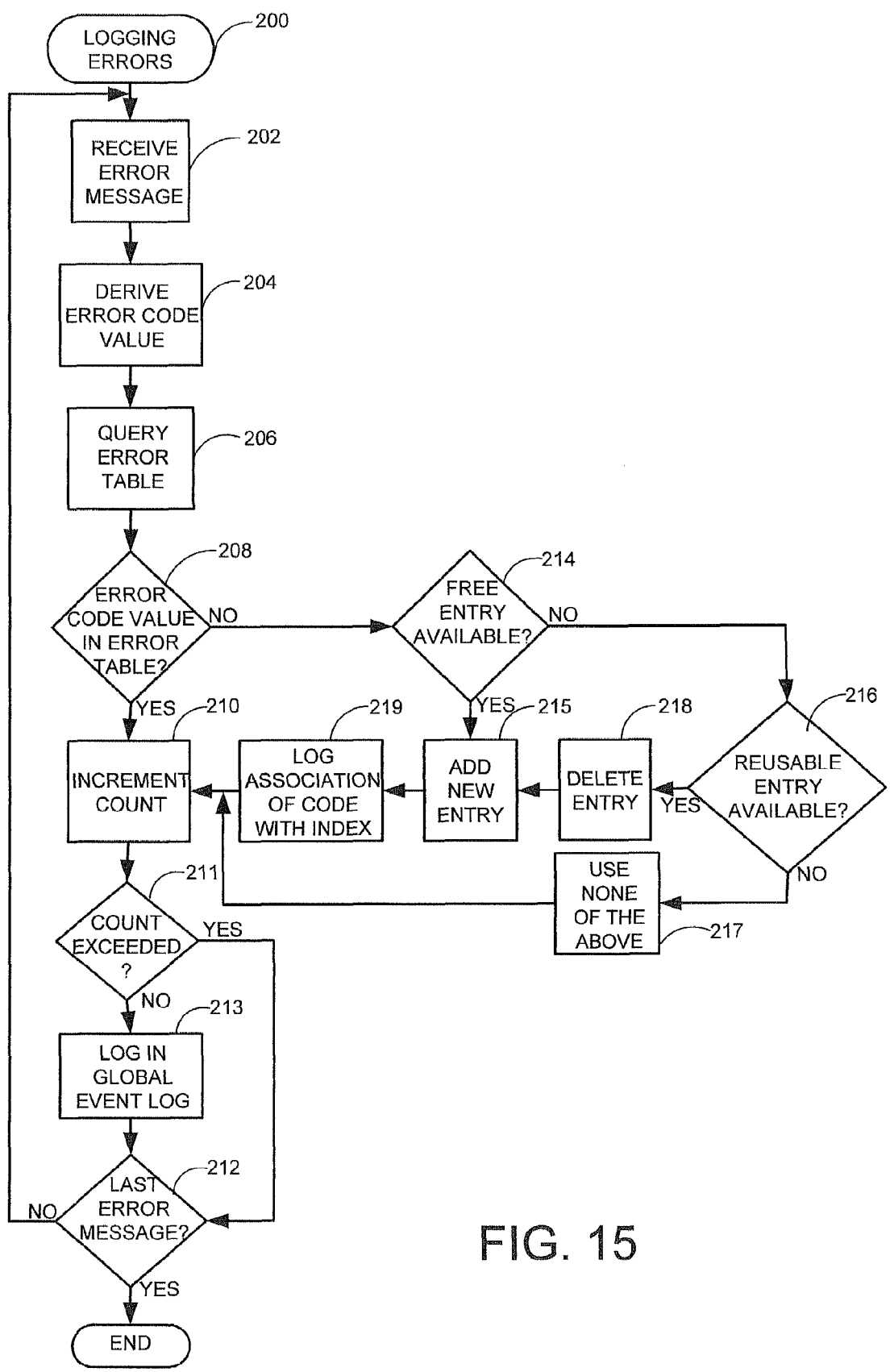
FIG. 15 is a flowchart of steps for practicing a method for LOGGING ERRORS in accordance with embodiments of the present invention.

FIG. 15 is a flowchart showing steps in a method 200 for LOGGING ERRORS in accordance with embodiments of the present invention. The method 200 begins in block 202 when the device interface manager 150 receives an indication of an error message. In block 204 the device interface manager 150 parses information from the error message (such as 158) in order to derive the error code value 190. In block 206 the device interface manager 150 queries the error table 191 for the error code value 190.

In block 208 it is determined whether the error code value 190 resides in the error table 191. If the determination of block 208 is yes, then the count for that error code value is incremented in block 210 and control passes to block 211. To advantageously limit the size of the error table 191, the incrementing can cease when the count reaches a predetermined threshold, such as by employing a count, mark, and hold process of acknowledging the entries. Because the first tier and second tier entries are fixed in the error table 191, it's not necessary to log each incrementing of the respective counters there. Rather, the count values for the indexes can be logged to the global event log 134 periodically according to a suitable predetermined interval.

However, if the determination of block 208 is no, then in block 214 it is determined whether there is a free entry available in the error table 191. By "free entry" it is meant that an unused second tier index is available for use. If the determination of block 214 is yes, then a new index is added to the error table 191 in block 215 corresponding to the error code value derived in block 204.

However, if the determination of block 214 is no, meaning the second tier is full, then in block 216 it is determined whether a reuseable entry exists. By "reuseable entry" it is meant that retaining a present entry is likely of lesser value than retaining the new error code value. As discussed above, this determination is based on predetermined rules that factor in parameters such as but not limited to frequency and/or aging values.

If the determination of block 216 is yes, then in block 218 the selected entry is deleted and control passes to block 215 where the new entry is added to the error table 191, and then to block 219 where the association of the new code value with the index is logged in the global event log. However, if the determination of block 216 is no, then in block 217 "None of the Above" index is referenced in the error table 191.

In block 210 the respective counter is incremented. Block 211 compares the newly incremented count value to a predetermined threshold. If the threshold is not exceeded, then the error event is logged in the global event log in block 213. If the threshold is exceeded, then logging is inhibited as control passes to block 212.

Block 212 determines whether there are more error messages to process. If so, then control returns to block 202; otherwise, the method 200 ends.

Summarizing generally, the present embodiments generally contemplate a data storage system comprising a software system resident in a memory space configured to execute access commands, and means for logging error events occurring while executing the access commands. For purposes of the present description and meaning of the appended claims the term "means for logging" requires the expandable error table of FIG. 14 wherein some if not all of the entries are self-determining, based on quantifying the content of error messages as they occur. The term "means for logging" expressly does not include previously attempted solutions whereby error log entries are entirely predefined based on all possible errors or on expected errors.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A method comprising:
    logging an error event by deriving an error code value via a device interface manager executing computer instructions in terms of information parsed from a SCSI error message that is associated with the error event;
    comparing the error code value to predetermined expected value error table entries stored in a computer readable memory and unexpected value error table entries stored in a computer readable memory; and
    indexing the error table in relation to an entry that is associated with the error code value being neither one of the expected value error table entries nor one of the unexpected value error table entries.

2. The method of claim 1 characterized by parsing a status code from the SCSI error message to derive the error code value.

3. The method of claim 1 characterized by parsing a sense code from the SCSI error message to derive the error code value.

4. The method of claim 1 characterized by parsing an additional sense code from the SCSI error message to derive the error code value.

5. The method of claim 1 characterized by parsing an additional sense code qualifier from the SCSI error message to derive the error code value.

6. The method of claim 1 characterized by combining two or more codes in the SCSI error message from a set of codes consisting of a status code, a sense code, an additional sense code, and an additional sense code qualifier to derive the error code value.

7. A method comprising:
    deriving via a device interface manager executing computer instructions an error code value in response to receiving an error message associated with an error event, to quantitatively characterize the error event; and
    selectively storing in an error table residing in a computer readable memory the error code value on the basis of a quantitative comparison between the derived error code value and each of a fixed number of predetermined expected value error table entries and between the derived error code value and each of a variable number of unexpected value error table entries that are different than the expected value error table entries, and by indexing an error table entry that is neither one of the expected value error table entries nor one of the unexpected value error table entries when the number of unexpected value error table entries is a predetermined threshold.

* * * * *